Oct. 11, 1949.	A. FEUCHT	2,484,338
LUBRICATOR

Filed Dec. 26, 1944	2 Sheets-Sheet 1

INVENTOR.
ALBERT FEUCHT
BY
ATTORNEY

Oct. 11, 1949.　　　　　A. FEUCHT　　　　　2,484,338
LUBRICATOR

Filed Dec. 26, 1944　　　　　　　　　　　　　2 Sheets-Sheet 2

*INVENTOR.*
ALBERT FEUCHT

BY

ATTORNEY

Patented Oct. 11, 1949

2,484,338

UNITED STATES PATENT OFFICE 2,484,338

LUBRICATOR

Albert Feucht, Garfield Heights, Ohio, assignor, by mesne assignments, to Le Roi Company, Milwaukee, Wis., a corporation of Wisconsin Application December 26, 1944, Serial No. 569,779

5 Claims. (Cl. 184—55)

The present invention relates broadly to lubricators and more particularly to that type of lubricator which is placed in a hose line of pneumatically operated tools, such as rock drills and the like, the lubricant being introduced into the fluid passing through such line to the tool.

The hose line of a pneumatically operated tool is ordinarily disposed in a horizontal or nearly horizontal position during the normal operation of the tool. It quite frequently occurs, however, that the operator of the tool finds it necessary to twist or turn the line when changing the position of the tool. The lubricator in accordance with the present invention, has been designed so that lubricant will be introduced into the fluid passing through the hose line to the tool even though the line is subjected to a twisting, turning or rotary motion during the operation of the tool.

The primary object of the invention resides in the provision of a lubricator in which lubricant is continuously fed to the tool while in operation, regardless of the movement imparted to the hose line.

Another object of the invention is to provide a lubricator which can be rotated about its horizontal axis in the movement of the hose line without interfering with or shutting off the flow of lubricant being fed to the tool through the hose line.

A further object of the invention is to provide a lubricator of the above character wherein the lubricant is always picked up from the lower section of the lubricator and air is always introduced to and vented from the top section of the lubricator.

A still further object of the invention is to provide novel means of an effective character for controlling the amount of lubricant delivered into the motive fluid.

Other objects and advantages more or less ancillary to the foregoing reside in the specific construction and aggroupment of the elements peculiar to this structure, as will become apparent from a more complete examination of the specification.

Figure 1:
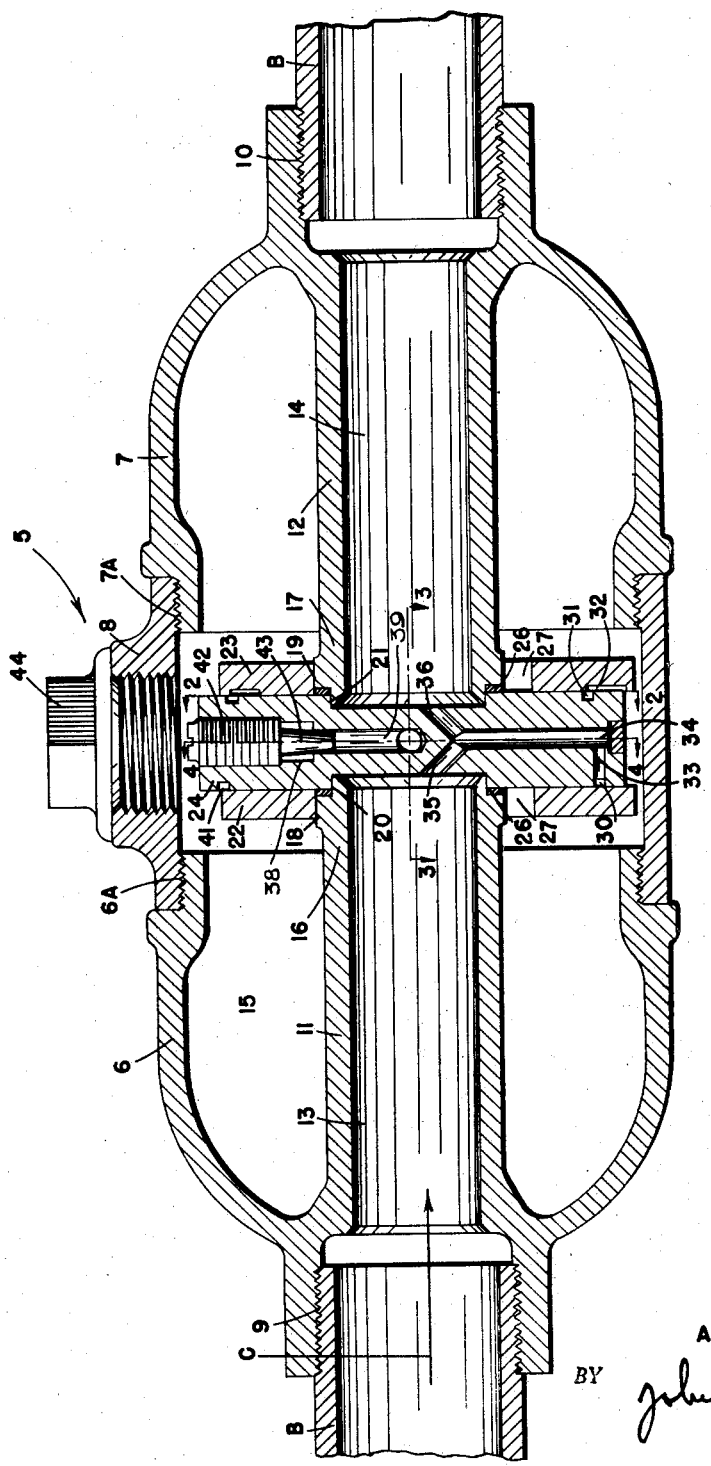
Figure 1 is a longitudinal sectional view through the preferred embodiment of the invention.

Referring to the drawings for a more detailed description thereof, the new and improved lubricator includes a casing generally designated by the reference numeral 5, and comprises sections 6 and 7 threadedly united as at 6a and 7a with a central section 8. The ends of the casing have coupling nipples 9 and 10 at which sections of the hose B of a pneumatically operated tool may be attached in any well known manner. The ends also have inwardly extending tubular nipples 11 and 12 provided with central bores 13 and 14 respectively in alignment with the nipples 9 and 10. The motive fluid for actuating the tool is conveyed through the central bores into the hose line B. The interior of the casing around said tubular nipples 11 and 12 constitutes a lubricant reservoir 15.

Figure 3:
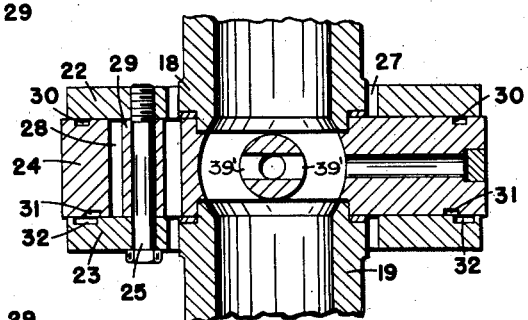
Figure 3 is a horizontal sectional view taken substantially on the line 3—3 of Figure 1.
Figure 4:
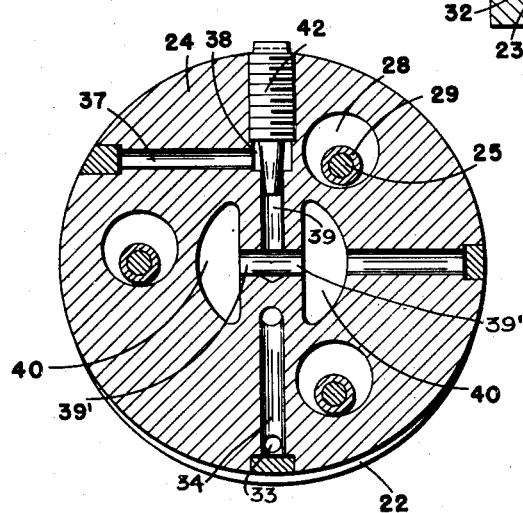
Figure 4 is a vertical sectional view taken substantially on the line 4—4 of Figure 1.

The inner ends 16 and 17 of the nipples 11 and 12 are spaced from each other and each end is formed with integral collars 18 and 19 adjacent to the cylindrical supporting ends 20 and 21 respectively. The collars 18 and 19 provide a means for supporting the circular plates 22 and 23, which plates are coupled with a central plate 24 by means of bolts or the like 25. The central plate 24 is positioned substantially centrally thereof so as to rest upon the ends 20 and 21 of the nipples 16 and 17 respectively and said plate is held immovable relative to the casing sections 6, 7 and 8 by being clamped between the nipples 11 and 12 through the threaded engagements at 6a and 7a, and is sealed on the nipples by means of gaskets 26. While the central plate 24 is immovably held on the ends 20 and 21, the outer plates 22 and 23 are capable of radial and rotational movement relative to said nipples. Referring to Figures 1 and 3, it will be noted that the plates 22 and 23 are formed with a central bore 27, the inner diameter of which is larger than the outer diameter of the collars 18 and 19 so that when the casing 5 is in the position shown in Figure 1 said plates will have bearing engagement with the upper portion of the nipples while being free of engagement on the lower portion thereof to permit the plates 22 and 23 to be free to float on the nipples for a purpose to be hereinafter described.

The means of connecting plates 22 and 23 to the central plate 24 is shown in Figure 3. The plate 24 is formed with a series of bores 28 in each of which is carried a spacer 29 through which passes a bolt 25. The length of the spacer 29 is slightly greater than the thickness of the central plate 24, so that when the several parts are assembled within the interior of the casing 5 by means of the bolt 25, the circular plates 22 and 23 will be held in sliding engagement with the central plate 24 and will be free to move radially and rotatively relative to the plate 24 within the limits imposed by the collars 18 and 19 and the bores 28. Normally, of course, these floating plates will always be suspended on the upper surface of the collars 18 and 19.

Figure 2:
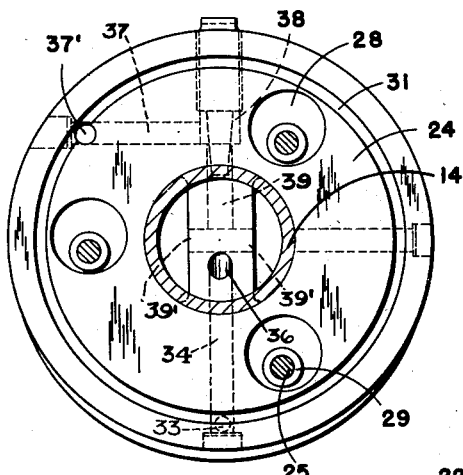
Figure 2 is a vertical sectional view taken substantially on the line 2—2 of Figure 1.

The plate 24 is formed with an annular recess 30 adjacent the plate 22 and a similar recess 31 adjacent the plate 23. The plate 23 is formed with an annular recess 32 which opens into the reservoir 15 and which also communicates with the recess 31. The annular recess 30 communicates with a longitudinal bore 33 which is in turn in communication with a relatively large vertical bore 34, the upper end of which communicates with two divergent inclined passages 35 and 36, which extend outwardly as shown for communication with the nipple bores 13 and 14. The annular recess 31 communicates with a short bore 37' which opens into a transverse bore 37 (see Figure 2) which in turn communicates with a recess 38. The lower end of the recess 38 connects with a passageway 39, the ends 39' of which terminate in the ducts 40 of the central plate 24 which joins the central bores 13 and 14.

In the operation of the device the plates 22 and 23 are always toward the bottom of the reservoir. As shown in Figure 1, the reservoir 15 is filled with lubricant while leaving the upper ends of the plates exposed. The air for operating the pneumatic tool goes, for example, in the direction of the arrow C, passing through the central plate 24 by way of the ducts 40. The air being under pressure, will enter the recess 35 and pass downwardly through the bores 34 and 33 into the annular recess 30, from where it is vented at the top of the plate 24 through the gap 41. This places the lubricant within the reservoir under pressure and maintains the same under pressure so long as the tool is operating or motive fluid is being fed through the line. Lubricant will then be picked up in the bottom of the reservoir through the annular recess 32 and conveyed into the annular recess 31 and from the latter recess passes through the bore 37 into the recess 38 and passageway 39, from where it is discharged through the ends 39' into the ducts 40, to be picked up by the motive fluid and carried to the tool. The plates 22 and 23 being free to float on the flanges 18 and 19 together with the arrangement of the annular recesses 30 and 32, provides for the lubricant to be picked up from the bottom of the reservoir and the motive fluid to be introduced and vented from the top of the reservoir. It will be understood that a portion of the annular recess 32 is out of contact with the central plate 24 in the bottom of the oiler while the annular recess 30 is out of contact with the plate 22 at the top of the reservoir. These relative positions of the plates and annular recesses will be maintained regardless of the degree of rotation of the casing 5 about its horizontal axis. Thus the tool will be constantly lubricated so long as it is in operation and motive fluid is passing through the nipples 11 and 12.

In order to adjust the amount of lubricant being fed to the tool, there is provided a metering screw 42 mounted within the recess 38, said metering screw being formed with a tapered end 43 movable through the recess 38 into or out of the bore 39 for governing the amount of lubricant discharged therefrom. A screw driver or similar tool can be employed for adjusting the metering screw, access to which is obtained through the nut 44 provided in the central section 8 of the casing 5. The nut 44 is also to be removed for replenishing the supply of lubricant within the reservoir. As is to be understood, the lubricant within the reservoir should never cover the top of the annular recess 30 at the point 41, otherwise the motive fluid will not be free to be vented therefrom.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a lubricator, a tubular conductor for pressure fluid, a tubular casing surrounding said conductor and enclosing an intermediate space constituting a lubricant reservoir, a control plate extending transversely through said conductor having parallel outer surfaces between said conductor and said casing at right angles to the conductor, said plate having a circular groove on each of its opposite sides, said plate having passages to connect the interior of said conductor with one of said grooves for establishing pressure therein, gravity actuated means for covering the lower portion of said groove and exposing the upper portion thereof, said plate having passages for connecting the other circular groove with a lubricant discharge port internally of said conductor, and gravity actuated means for covering the upper portion of said last named groove and exposing the lower portion as a lubricant intake.

2. A lubricator as defined in claim 1, characterized in that both of said gravity actuated means are rings supported upon said conductor having central openings larger than said conductor and having smooth faces engaging the opposite surfaces of said plate, and means for holding said rings in sliding engagement with said plate.

3. A lubricator as defined in claim 2, wherein said means for holding said rings in sliding engagement with said plate comprises screws and tubular spacers joining the rings and extending through holes in said plate of larger diameter than said spacers.

4. A lubricator as defined in claim 1, wherein the said passages for establishing pressure in said first named groove comprise a radial passage and an inclined passage connecting said radial passage with the interior of said conductor on the up stream side of said plate, the angle between said radial and inclined passages being greater than 90°.

5. In a lubricator, a tubular conductor for pressure fluid, a tubular casing surrounding said conductor and enclosing an intermediate space constituting a lubricant reservoir, a control plate extending transversely through said conductor having parallel outer surfaces between said conductor and said casing at right angles to the conductor, said plate having a circular groove on each of its opposite sides, said plate having passages to connect the interior of said conductor with one of said grooves for establishing pressure therein, gravity actuating means for covering the lower portion of said groove and exposing the upper portion thereof, said plate having passages for connecting the other circular groove with a lubricant discharge port internally of said conductor, gravity actuated means for covering the upper portion of said last named groove and exposing the lower portion as a lubricant intake, both of said gravity actuated means being rings supported upon said conductor having central openings larger than the said conductor and having smooth faces engaging the opposite surfaces of said plate, the gravity actuated ring which cooperates with the second named circular groove for controlling lubricant intake being provided with an annular groove of a width great enough to bridge the space between said last named plate groove and the perimeter of the control plate, and means for holding said rings in sliding engagement with said plate.

ALBERT FEUCHT.

REFERENCES CITED

The following references are of record in the file of this patent:

UNITED STATES PATENTS

| Number | Name | Date |
| --- | --- | --- |
| 1,656,708 | Hansen | Jan. 17, 1928 |
| 1,763,683 | Bayles | June 17, 1930 |
| 1,907,465 | Terry | May 9, 1933 |